March 3, 1970     T. T. KUMAGAI     3,498,717

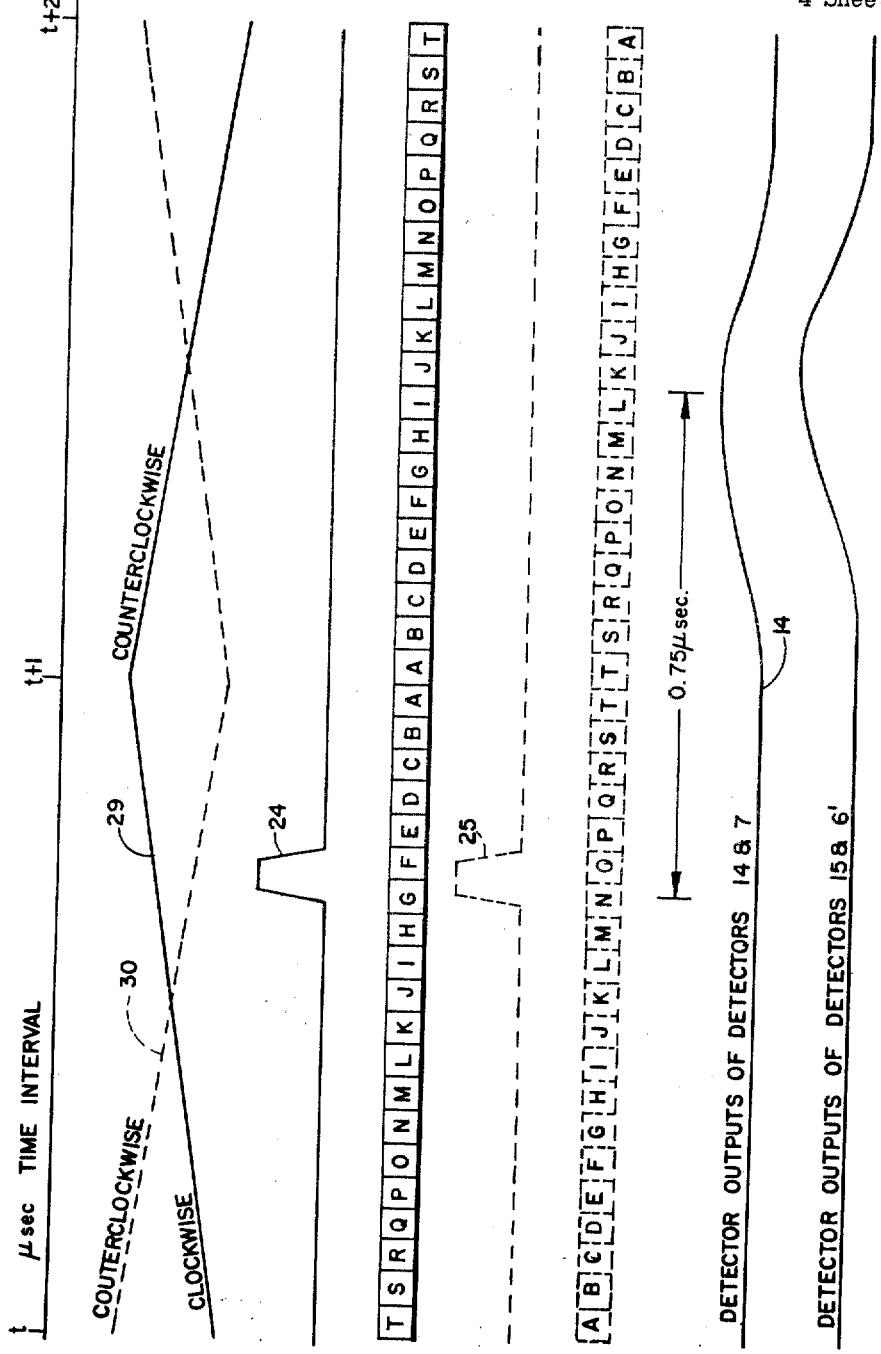

LASER RANGE DETECTOR SYSTEM

Filed Jan. 26, 1966     4 Sheets-Sheet 4

INVENTOR.
TOM T. KUMAGAI

BY *Robert G. Rogers*

ATTORNEY

United States Patent Office 3,498,717
Patented Mar. 3, 1970

3,498,717
LASER RANGE DETECTOR SYSTEM
Tom T. Kumagai, Anaheim, Calif., assignor to North American Rockwell Corporation, a corporation of Delaware
Filed Jan. 26, 1966, Ser. No. 523,131
Int. Cl. G01c 3/08
U.S. Cl. 356—5   7 Claims

ABSTRACT OF THE DISCLOSURE

The invention is directed to a laser system for determining the range of an object. A laser transmitter transmits pulses of light to an object. First and second optical means are used to receive and focus portions of the pulses reflected from the object. A first and second deflection means are interposed to receive the focused portions of the light pulses. The deflection means deflect each light pulse through an angle which is proportional to the time elapsed since transmission of the pulse. The direction of deflection of the first deflector is opposite to the direction of deflection of the second deflector. Detector means are provided to receive the deflected pulses of light and to provide an output signal indicative of the amount of deflection of the pulses which in turn will be proportional not only to the range of the object but also to the angle of the object with respect to the position of the system.

---

This invention relates to a system for measuring elapsed time between a transmitted laser pulse and a reflected laser pulse, and more specifically to a system for measuring the range to a target by translating elapsed time between a transmitted and a reflected pulse into a spatial deflection proportional to range.

In the application of laser systems for range determination, the range to the target is usually obtained by measuring the difference between the time a pulse is transmitted and the time a reflected pulse is received. The usual means of performing the time measurement is by starting a timing counter with a signal derived from the transmitted pulse and stopping the timing count when the pulse reflected by the target is received at a detector. This method of determining the elapsed time measurement places a severe restriction upon the type of detector selected for use in a system. In order to discriminate between two sequentially reflected pulses and to achieve a range resolution corresponding to the pulse length of the signal, the detector response time must be less than the pulse length.

Low noise devices, such as photomultipliers, with high speed responses are generally not available for IR wavelength detection of radiation wavelengths greater than 1.2$\mu$. Therefore, photon detectors such as PbS, InAs, and Ge, doped with Cu, Au, Zn or Cd, or PbTe are used. The response time of those detectors is of the order of one microsecond. Since the minimum noise criteria for a receiver matched with a detector is that the bandwidth of the receiver be equal to the reciprocal of the response time of the detectors, the optimum receiver bandwidth is one megacycle for a one microsecond response time detector. In practice, however, the receiver bandwidth is required to be greater than or equal to the reciprocal of the response time of the detector. Noise due to dark current shot noise, background shot noise, Johnson noise, $1/f$ noise and thermal noise are all directly proportional to the square root of the bandwidth.

Thus, in order for a receiver to be responsive to a reflected laser pulse signal having a pulse length within ten nanoseconds, the bandwidth of the receiver must be at least greater than or equal to 100 megacycles. As a result, all noise contributions are increased by a factor of ten.

Laser materials develop high energy pulses beyond the 1.2$\mu$ sensitivity of the photomultipliers. Further, because of the time response limitations, IR detectors have not yet been designed except at cryogenic temperatures to respond to the pulse length of Q-switched laser pulses for wavelengths in the IR band above 5$\mu$.

In the region 1.2$\mu$ to 5$\mu$ detectors with less than 1$\mu$ second response time are available, but are inadequate for laser ranging pulses.

Therefore, it is an object of this invention to measure range by means of spatial deflection in lieu of direct time measurements.

It is another object of this invention to provide a laser range detecting system which does not require the receiver bandwidth to be greater than or equal to the reciprocal of the pulse length.

It is a further object of this invention to provide a laser range detecting system in which the receiver has a bandwidth corresponding to the response time of the detector and not the pulse length.

It is another object of this invention to overcome the restriction upon response time of a detector for ranging in the IR wavelengths.

It is still another object of this invention to translate elapsed time between a transmitted pulse and a received pulse into a spatial deflection indicative of range.

It is still a further object of this invention to increase the probability of target detection without the loss of accuracy in ranging resolution.

It is still a further object of this invention to control deflection of reflected laser energy as a function of range to a target.

Briefly, the invention comprises means for transmitting pulses of laser energy, means synchronized with the transmission means for causing deflection of returned laser pulses reflected from a target through an angle related to target range. The received pulses are deflected through a pre-selected angle onto detecting means, such as an arrangement of photovoltaic cells, PEM mode detectors, or a matrix array of detectors. The detecting means may be geometrically arranged so that one row of detectors, having spacings between each, is placed in juxtaposition with another row of detectors also having spacings but laterally shifted with respect to the first row so that the spaces are covered by detectors of the second row. In this way, all positions in space are covered, and if a pulse strikes between detectors of the first row it strikes the second row of detectors.

One feature of the present invention is the use of a deflecting means synchronized with the transmitting means. Such a deflecting means may be a spinning or oscillating reflector or prism, which is placed on the optical return path of the reflected laser beam. The piezoelectric effect may be used to oscillate the reflector or prism, or alternatively, the reflector or prisms may be driven by a motor or some other means for deflecting the reflected beam through a preselected angle.

Another feature of the present invention is the provision of means for compensating for an error caused by the signal returning at a angle with respect to a defined primary optical axis within the receiving optical system. The laser pulse may be reflected back on the optical axis of the optical system or it may return at an angle to the optical axis. In the latter case, compensation must be provided if a range error is not to be introduced. Further, in the system of the present invention the error compensation due to angle is dependent on the angle to the primary axis at which the laser energy returns.

These and other objects and features of this invention will become apparent in the following detailed description including the drawings, in which:

FIGURE 1a is a typical waveform of the output of the sawtooth generator of FIGURE 1;

Figure 1:
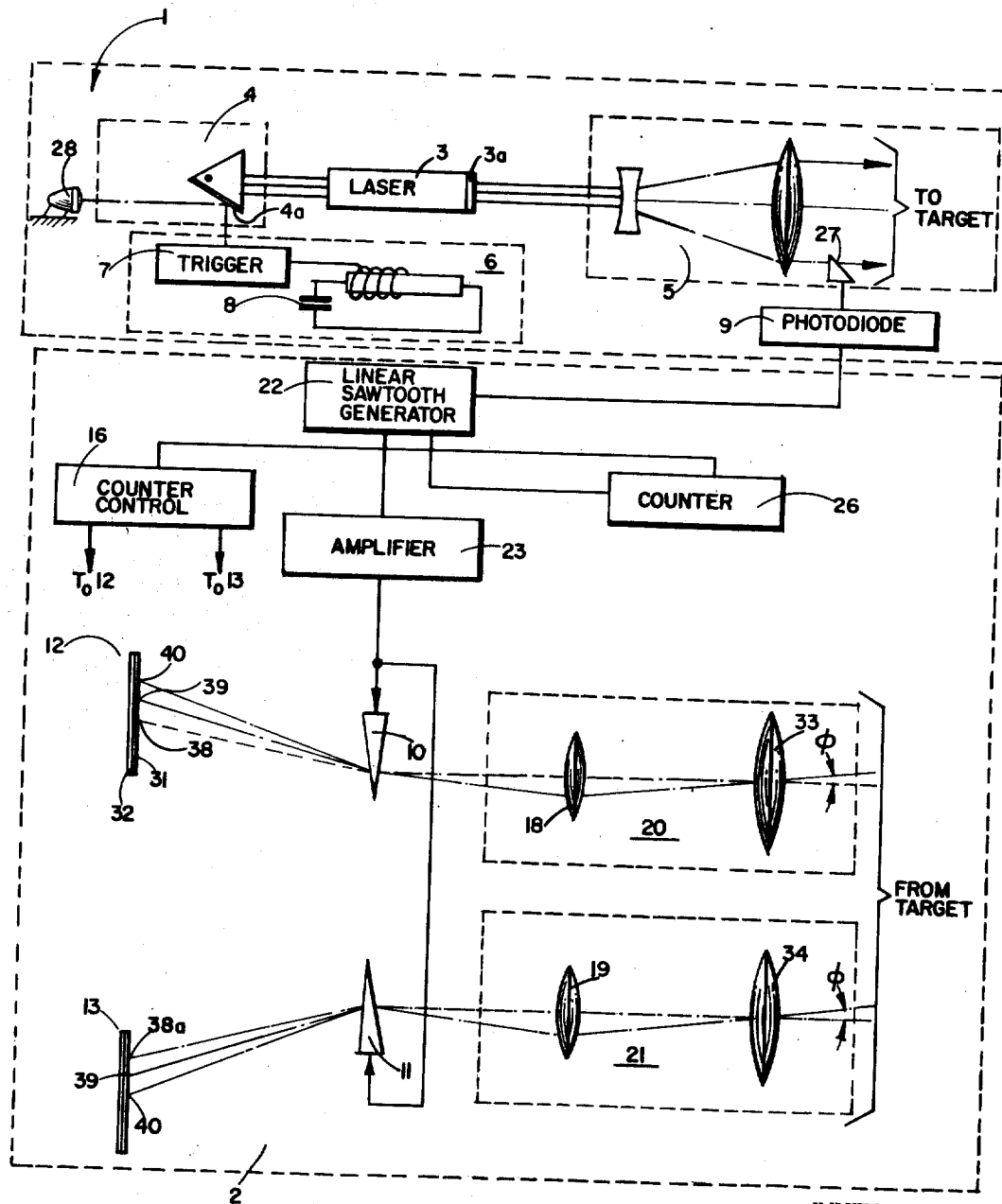
FIGURE 1 is a diagram of one embodiment of a laser range detector system of the present invention.

Referring now to FIGURE 1, the laser range detector of the present invention includes a laser transmitter 1 and laser receiver 2. The transmitter 1, for the embodiment shown, is comprised of a laser rod 3 including partially silvered mirror 3a, Q-switching means 4, preferably a rotatable roof top reflector 4a having an outer mirrored surface, optical means 5 for directing laser radiation toward a target, and flash means 6 for energizing the laser rod 3. The laser rod 3 may be fabricated from any laser material, for example, ruby or neodynium doped materials well-known in the art. Flash means 6 is comprised of trigger 7 and flash tube 8. In operation, light from source 28 is reflected by the rotating mirror surface 4a positioned on switching means 4 to a photo diode in trigger 7. The energization of trigger 7 initiates the operation of flash tube 8, e.g., a tungsten flash bulb, to emit white light.

The light from tube 8 in flash means 6 supplies energy to "pump up" laser rod 3. When the flash means 6 is energized a population inversion takes place in rod 3 which in turn is amplified when the internal reflecting surface of roof top reflector 4 is optically aligned with the rod 3. The light emitted is directed toward a target by optical means 5. The operations of the various elements of the transmitter 1 are synchronized so that the trigger means 7 fires flash tube means 8 just prior to the optical alignment of roof top reflector of switching means 4. The roof top reflector of switching means 4 may be rotated, for example, by an air driven motor at 20,000 r.p.m.

It is also within the purview of this embodiment of the present invention to utilize other Q-switching means 4 such as a rotating prism, spinning reflector, Kerr cell or other well-known devices. Optical means 5 for directing laser energy towards a target are well-known in the art and are not further described herein.

Operatively associated with transmitter 1 is coupling means 9 for monitoring the laser transmitter and for synchronizing the transmission and the detection functions of the laser range detector system. Specifically, a prism or other reflecting device 27 deflects a small portion of the light transmitted toward the target by optical means 5 to a photodiode circuit 9. The coupling means 9, upon energization by light from prism 27, synchronizes the laser receiver means 2 as described in detail hereinafter.

Laser receiver means 2 includes variable prism means 10 and 11, spatial detector means 12 and 13. Optical means 20 and 21 directed toward the target (not shown) are aligned in parallel relationship to each other and to the primary axis connecting the receiver 2 and the target and direct reflected light to the variable prism means 10 and 11. Other lenses may be included between means 10 and 11 and the detectors, if necessary, to focus the beam onto the detectors.

The receiver 2 in the embodiment of FIGURE 1 includes a sawtooth generator 22 responsive to the pulse output of coupling means 9, and amplifier 23 for amplifying the signal from generator 22 to obtain a desired amplitude.

FIGURE 1a contains an illustration of prism deformation in response to the signal produced by generator 22. For purposes of the illustration, certain assumptions are made. For example, it is assumed that detector means 12 and 13 comprise 20 detectors (A to T) and that each detector requires $0.75\mu$ seconds response time. The detectors are shown in a twin relationship with the prism deformation. Laser pulse lengths of 50 nanoseconds at 3 db level are also assumed. It is further assumed that curve 29 is taken from prism 10 and curve 30 from prism 11.

As shown in FIGURE 1a, prism means 10 deforms from an assumed minimum from an assumed origin $t$ to an assumed maximum at $t+1$. Simultaneously, prism means 11 is deforming. When a laser pulse 14 is received, it is deflected in a clockwise direction through prism 10 onto detectors G and F of detection means 12. Similarly, pulse 15 is deflected counter clockwise through prism means 11 to detectors N and O of detection means 13. The detectors respond approximateily $0.75\mu$ seconds after receiving the laser pulses to produce the signals as indicated by curves 14 and 15. The signals are directed to counter control 16 to register the position of the pulses. By knowing the time constants of the detectors in terms of response time, output circuit logic, known in the art, can be designed to indicate the range of the object from which the pulse was reflected. Two prisms are used to compensate for errors introduced when the laser pulses are received at an angle different from the principal axis of the optic means. These errors are described subsequently.

Prisms 10 and 11 are fabricated from a piezoelectric material which deforms a predetermined amount in response to the signal from amplifier 23.

The prism 10 is oriented so that upon the application of a pulse from amplifier 23 the light received from optic means 20 will be deflected in a preselected direction, e.g., clockwise, by a predetermined amount. The prism 11 is oriented so that upon the application of a pulse from amplifier 23 the light received from optic means 21 will be deflected in a direction opposite to the direction of the deflection of prism means 10, e.g., counterclockwise, by a predetermined amount, preferably equal. Both prism means 10 and 11 are responsive to the same pulse.

Figure 4:
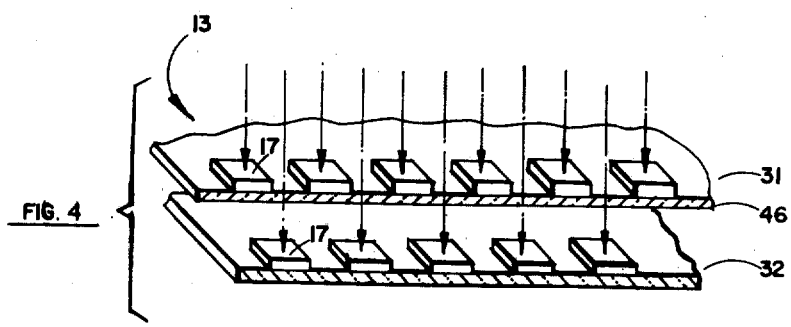
FIGURE 4 is a perspective view of the detector arrangement utilized in the present invention.

Each detector means 12 and 13 includes a plurality of detector units supported in spaced relation to each other. Each unit, see FIGURE 4, has a plurality of individual cells 17 located in spaced relation on a plurality of levels 31, 32. In this manner, light may be directed to either level 31 or to the offset cells of level 32 through transparent layer 46. Detector 13 is shown in FIGURE 4 in an exploded view.

Each level 31 or 32 has a plurality of individual cell units 17 spaced from each other in a direction normal to the optical axis. The two levels 31 and 32 are positioned so that area between cells 17 in level 31 coincides with the area of the cells 17 in level 32. In this manner, the possibility that a reflected light pulse might strike an area between two detector cell units is eliminated. In the cell arrangement shown in FIGURE 4, wherein row 32 is spaced behind row 31 by a distance of approximately one-half cell width, all positions in the space are covered. Row 31 and row 32 may comprise detecting means such as a photovoltiac cell, a PEM mode detector, or a matrix array of detectors, appropriately interconnected.

In operation, a pulse of energy is transmitted by transmitting means 1 towards a target from which it is reflected and received by receiver means 2. The signal passes through input optical means 20 for proper focusing onto prism means 10. Depending on the state of amplifier 23, prism means 10 deflects the signal in a preselected direction onto a location of detector means 12.

Figure 2:
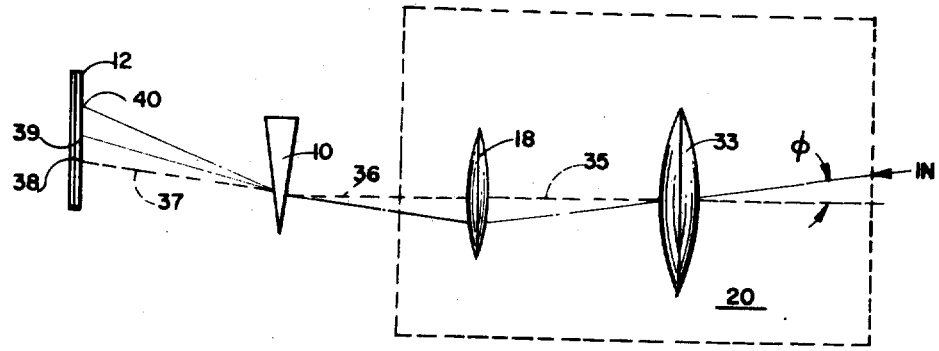
FIGURE 2 is one embodiment of an optical system and variable deflection prisms for measuring off-axis angle.
Figure 2:
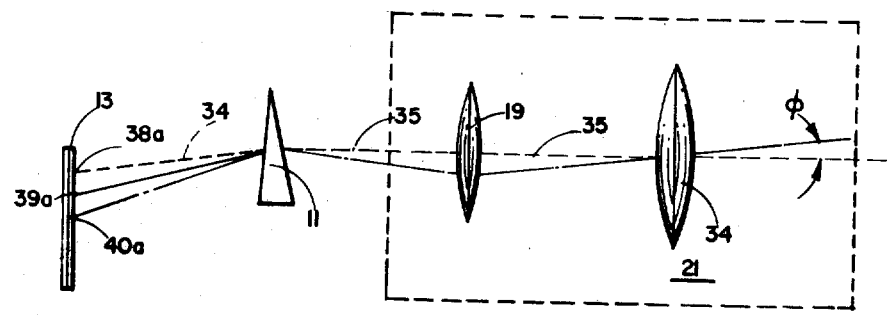

This deflection operation is more apparent from FIGURE 2 which shows the optics 20 and 21, detectors 12 and 13 and prism means 10 and 11 from FIGURE 1. Additional focusing lenses may be added if necessary to refocus the incoming beam after deflection by the prism means. The path which the incoming beam would follow if the target lies on the principal axis of the receiving means 20 is indicated by the dotted lines 35, 36 and 37. If the target is at an off-axis angle $\phi$ to the principal axis of the receiving optical means, the returning laser signal, shown as a solid line 40 is deflected by a selected one of the variable prisms 10 and 11, for the illustrated example, an additional angle which is proportional to the off-axis angle of the target. Thus, the measured range of the basic spatial detector has an error in range proportional to the off axis angle of the target relative to the principal axis of the receiver means.

As explained above, the prism means 10 and 11 are deformed in response to an electrical signal from a generator (see FIGURE 1) during the period in which a pulse of energy is transmitted from the system and received by the system. The deformation has the effect of deflecting the returning pulse through a known angle proportional to the deformation of the prism means. For purposes of the description, the size of the detector and the sweep angle of the prism are seen to be sufficiently large to indicate the entire range of the target. If it is assumed that the target has zero range and was on the principal axis, a returning pulse would follow the path 35, 36 and 37 and would be deflected by prisms 10 and 11 onto the respective detector means 12 and 13 at points 38 and 38a. In each case, the prisms 10 and 11 refract the light through a known angle since the refractive indices of the materials of the prisms are known and the angle at which the incident beam makes with the initial surface may be preselected, e.g., normal. For targets having a range, however, the return pulses are received during the time prisms 10 and 11 are deformed and therefore impinge on the detectors 12 and 13 at points 39 and 39a. The distance between the principal points 38 and 38a and the respective points 39 and 39a are not equal, however, since deformation of the prisms will change the refraction angles and their opposite orientation will result in different deflection distances. If the target is located off the principal axis at an angle $\phi$, the returning signals are deflected at a greater angle since the angle of incidence on the prisms 10 and 11 have been changed. Thus, for an angle $\phi$ the signal received at detector 12 will be further deflected to points 40 and 40a while the signal on detector 13 will be deflected through a smaller angle. Thus the distances between the principal points 38 and 38a and the detected points 40 and 40a will be unequal because of refraction considerations well known in the optical art.

Thus, by passing the return beams through variable prisms which counter-deflect the beams relative to each other, the true range and off-axis angle may be determined from the relationships:

$$R = \frac{(R'+r\phi)-(-R'+r\phi)}{2} \quad (7)$$

$$\phi = \frac{(R+r\phi)+(-R+r\phi)}{2r} \quad (8)$$

In the above expressions, the quantities in parentheses are the relative signal positions 40 on the two detectors. The angle $\phi$ can represent either elevation or azimuth, relative to the principal axis, depending upon the orientation of the variable prisms. In practice, the deflection $r\phi$ should be of the order of the deflection component R. Thus, if the variable prism deflects the return beam 2.5° for each 1,000 feet range, the above signal processing should be capable of processing off axis angles of the order of 2.5°.

When extremely long ranges are to be measured a counter control 26 is utilized. Counter control 16 in response to the reflected beam being detected by 12 and 13 de-energizes counter 26. The number of counts, i.e., saw-tooth waves, counted by counter 26 would then give a gross range indication and the fine range measurement would be obtained from the spatial deflection. However, in view of the speed of response such an arrangement would be utilized for only very long ranges.

In operation the range of a target is determined by translating the time between a transmitted and a returned pulse of energy into deflection. For example, if a spinning reflector is used as a deflection means during the time between the transmitted and received pulse, the reflector rotates through angle $\theta$. Since it rotates through the angle $\theta$, the received pulse of energy is deflected a corresponding amount to a lateral position on the detectors. The position is an indication of the distance to the target.

The following derivations indicate how target range is determined by the system and also provides means for selecting the elements comprising the receiver means 2. For the purpose of the analysis assume the following definitions:
Te=Time between a transmitted and a received pulse.
r=The radius between the variable prism or spinning reflector and the plane in which the detectors are located.
W=The spin rate of the spinning reflector or the sweep rate of the variable prism in radians per second.
$\theta$=Angular displacement of the reflector or prism during time T.
R'=The range to the target.
c=Velocity of light.

It can be shown that $$2R' = cT \quad (1)$$

and $$dR' = cdT/2 \quad (2)$$

where $dR$ represents the smallest increment of change of target range which can be detected by the detector cells. $dT$ corresponds to the pulse width of the returned laser signal.

It can also be seen from the geometrical arrangement of the elements of the composite system that, $$d\theta = WdT \quad (3)$$

and $$d\theta = \frac{WdR'}{2c} \quad (4)$$

Since the deflection on the focal plane during the pulse width $dT$ is $rd\theta$, the target range resolution of the detector system is $$dR' = \frac{c(rd\theta)}{2Wr} \quad (5)$$

From the resolution of the detector, the radius $r$ can be calculated as follows:

$$r = \frac{(rd\theta)}{WdT} \quad (6)$$

where $(rd\theta)$ is the center-to-center spacing of the photosensitive elements comprising the detector and is measured as a unit. For purposes of the example, W is assumed to be 400 cycles per second and $dT$ is assumed to be $20 \times 10^{-9}$ seconds. Then, the required value of $r$ under those conditions is approximately 20 inches. Substituting that value for $r$, the range cell resolution becomes approximately 10 feet. In other words, the detector can detect changes in range of approximately 10 feet. In the above example, it was also required to assume that the center-to-center spacing of the photosensitive elements (see FIGURE 4) was $10^{-3}$ inches apart, and the $(rd\theta)$ represents the center-to-center spacing of the equation.

The number of photosensitive elements in the focal plane of the detector is determined by the ranges over which the device is required to operate.

Figure 3:
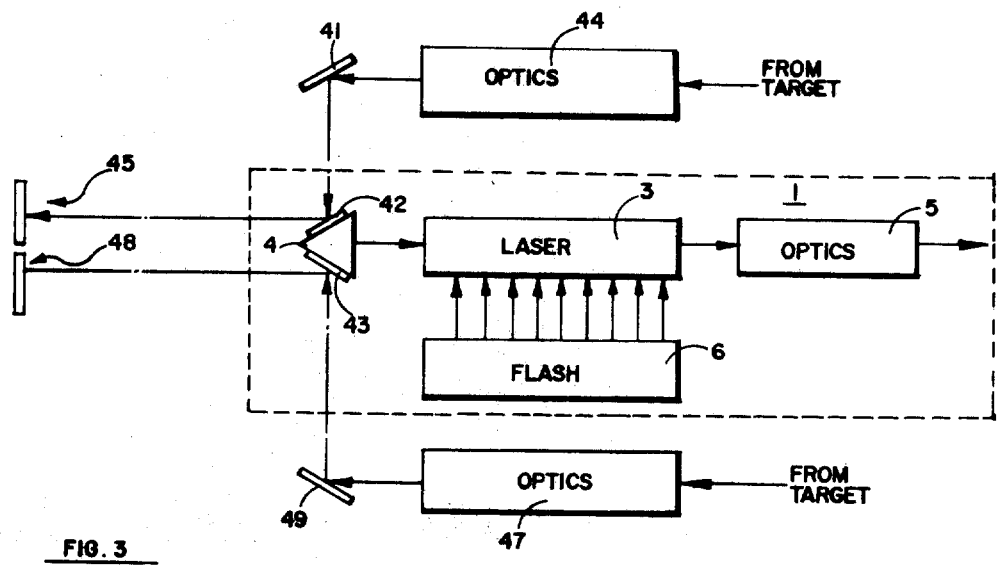
FIGURE 3 is a second embodiment of a system using the spinning reflector.

FIGURE 3 is an illustration of a system embodiment using a spinning reflector as a deflection means in lieu of the variable prism previously described. For purposes of the description, only one set of elements are described (although both sets are shown in FIGURE 3) for the receiver portion although as will be discussed later, to determine the off-axis angle, two sets as shown and described in connection with FIGURE 1, are used.

Referring now to FIGURE 3, there is shown the transmitting portion 1 and optics means 44 for focusing the return pulse onto reflecting surface means 41. The spinning reflector for the embodiment shown comprises reflecting surfaces 42 and 43 mounted on the back side of rotating prism means 4. Detector means 45 and 48 are shown in schematic representation.

Figure 5:
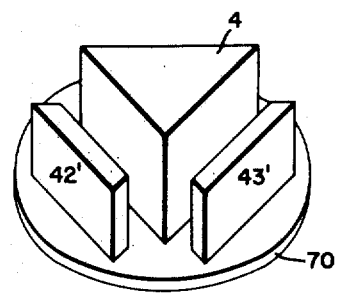
FIGURE 5 is a perspective view of a rotatable prism and reflectors synchronized to each other and spaced apart from each other and from the prism.

In operation the rotating prism 4 initiates the transmission of a pulse from previously pumped rod 3 and it is therefore synchronized with the received signal. It rotates an amount between the time the pulse is transmitted, received and reflected onto detector means 45. As shown in FIGURE 5, it should be obvious that the reflectors 42' and 43' do not have to be attached to the rotating prism 4 if means 70 consisting of a platform to which is attached prism 4 and reflectors 42' and 43' is used, the platform being driven by the same means used to drive prism 4 is added to insure that the rotating prism and the spinning reflectors are synchronized.

In the basic description of the embodiment shown in FIGURE 3, it was assumed that the target was located on the principal axis of the focusing or receiver optics 20, 21 and 44 for the embodiments in FIGURES 1 and 3. That assumption is not always true, since the target may not be located on the principal axis. As a result, some means for compensation for the deviation must be included in the system.

In order to compensate for the off-axis angle, additional elements are incorporated into the system. For example, optics 47 and reflector 49 may be added for reflecting returning pulses onto detector 48.

The mirrored surfaces 42 and 43 are positioned with respect to the principal axis of the receiving optics at the instant of laser pulse transmission as shown in FIGURE 3. Prism 4 rotates through a discrete angle during transmit-receive time $T_x$. As indicated in connection with FIGURE 2, if the target were on the principal axis and had zero range, a pulse would be received at points 38 and 38a on the detector surfaces, that is, the beams reflected by prisms would be parallel to the principal axis. For a target at range R located on the principal axis, the return signals would be detected at R or —R depending upon whether the mirror drives clockwise or counterclockwise. However, where the target is not on the principal axis, the description and equations developed in connection with FIGURE 2 are also applicable to the FIGURE 3 embodiment. Thus, the spatial deflections on detectors 45 and 48 would be similar to deflections 40 and 40a shown in FIGURE 3 and proper corrections for off axis target detections could be made.

Although the invention has been described and illustrated in detail, it is to be understood that the same is by way of illustration and example only and is not to be taken by way of limitations, the spirit and scope of this invention being limited only by the terms of the appended claims.

I claim:
1. In combination:
   laser means for generating and transmitting a light pulse;
   receiving means for receiving said light pulse reflected by a remote object;
   means for synchronizing the generating of said pulse with said receiving means; and
   means for compensating for errors due to the return of said light pulse at an angle displaced from a principal axis of said receiving means, the error compensating means comprising:
   a first variable deflection means;
   a first detector means responsive to said first variable deflection means for receiving a portion of the returned light pulse;
   a second variable deflection means spaced apart from and synchronized with said first variable deflection means;
   a second detector means responsive to said second variable deflection means and spaced apart from said first detector means for receiving another portion of the returned light pulse, said deflection means causing deflection of returning pulses of energy by an angle proportional to the time between said generated pulses and said returned pulses.

2. The combination in claim 1, wherein:
   said receiving means includes rotating means actuated by transmitted pulses for rotating said first and second deflection means for causing deflection of returning pulses of energy.

3. The system defined in claim 1, wherein said system further comprises:
   means for generating an electrical signal proportional in magnitude to the time elapsed since transmission of said light pulse; and
   wherein said first and second deflection means each comprises a prism, each said prism having a piezoelectric element attached to one surface thereof, said element being electrically connected to the generating means for changing the deflection angle of the deflection means.

4. The system as defined in claim 1 for determining the range of an object;
   a portion of the receiving means being a first optical means having a first optical axis, the reflected light pulse being directed along said first optical axis to said first deflection means; and
   another portion of the receiving means being a second optical means having a second optical axis substantially parallel to said first optical axis, the reflected light pulse being directed along said second optical axis to said second deflection means, whereby the range between the target and either of the detector means is a function of the relative signal position, displaced from the principal axis of the received light pulse, on said detector means.

5. A system for determining the range of an object, comprising:
   laser means for providing transmitted pulses of light towards said object;
   a rotatable prism for initiating the transmission of said pulses;
   a first means for optically receiving and focusing a first portion of said light along a first principal optical axis and along an optical axis displaced from said first principal axis;
   second means responsive to said first means and spaced apart from but synchronized with said rotatable prism for deflecting said first portion through an angle proportional to the time elapsed since transmission of the light pulse;
   third means for optically receiving and focusing a second portion of said light along a second principal optical axis and along an optical axis displaced from said second principal axis;
   fourth means responsive to said third means and spaced apart from but synchronized with said rotatable prism and said second means for deflecting said second portion through an angle proportional to the time elapsed since transmission of the light pulse; and
   first and second detector means spaced apart from each other and responsive to the light of said first and second portions respectively for determining the angular deflection of said transmitted pulses, whereby the range between the target and either of the detector means is a function of the displacement of the received light pulses on the detector means defined by said principal optical axis and the optical axis displaced with respect to said principal axis, the displaced optical axis being a measure of azimuth of the target with respect to the system.

6. The system defined in claim 5, wherein:
said first detector means comprises a plurality of photosensitive elements spaced along the loci of light deflected by said second means; and wherein
said second detector means comprises a plurality of photosensitive elements spaced along the loci of light deflected by said fourth means.

7. The system defined in claim 5, wherein said first and second detector means each comprises:
a transparent substrate;
a first group of photosensitive elements spaced apart from each other and attached to said transparent substrate; and
a second group of photosensitive elements spaced apart from each other and positioned with respect to the substrate so that said substrate is intermediate to said first and second group, whereby light deflected to a point between two elements of said first group will pass through said substrate to an element of said second group.

References Cited

UNITED STATES PATENTS 3,410,641  11/1968  Bergman _____ 331—94.5

RONALD L. WIBERT, Primary Examiner

V. P. McGRAW, Assistant Examiner